April 12, 1960
J. SOFFE
2,932,466
FISHING REELS
Filed Oct. 17, 1956
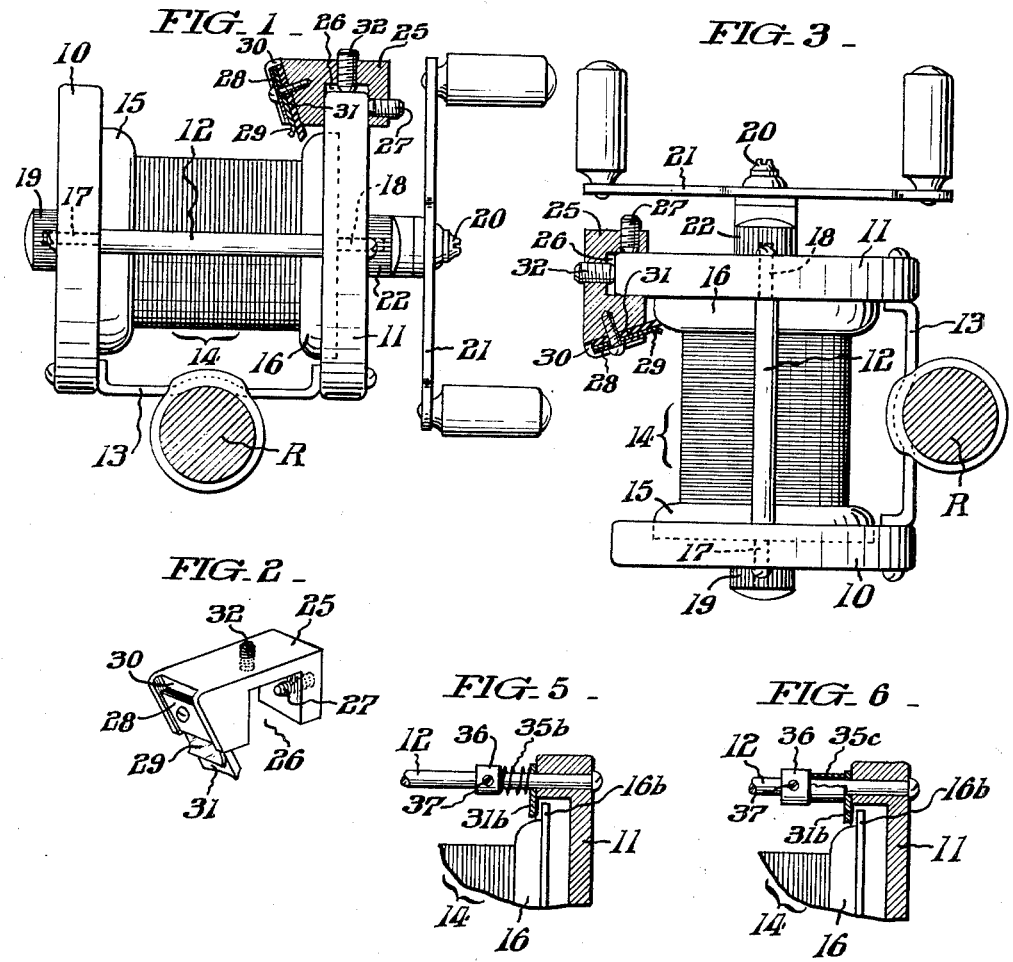
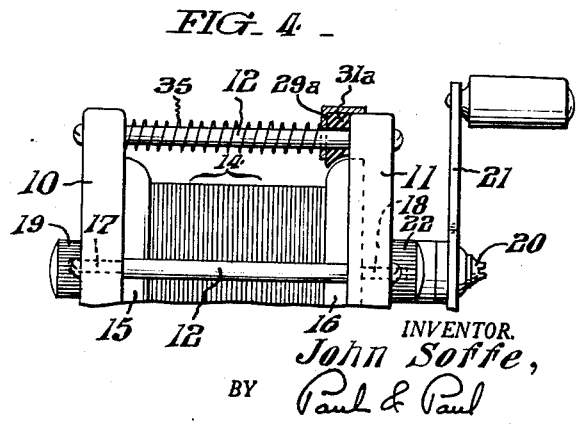
INVENTOR.
John Soffe,
BY Paul & Paul
ATTORNEYS ര
United States Patent Office 2,932,466
Patented Apr. 12, 1960

2,932,466

FISHING REELS

John Soffe, Pompano Beach, Fla.

Application October 17, 1956, Serial No. 616,442

1 Claim. (Cl. 242—84.52)

This invention relates to fishing reels, particularly to reels of the type adapted to be attached to casting rods.

In the use of fishing reels of the kind referred to, upon casting of the bait or of the decoys, the spools overrun due to momentum previously induced in them by pull of the weights and the force of the cast. As a consequence, considerable of the coils of the lines adjacent the surface of the winding expand circumferentially of the spool and become snarled or entangled with each other. Correction of this condition is not only painstaking, but entails back winding and, moreover, is annoying and time consuming.

The chief aim of my invention is to overcome the above mentioned difficulty. This objective is realized in practice through provision, in connection with such reels, of a simple spool restraining means whereby, when the rod is held in one position in casting, the spool is retarded momentarily until the lure on the line is in motion, then upon partial turning of the rod by a wrist movement of the hand in which the rod is held, the spool is released to revolve freely and let out the line, and when the force of the cast has been almost expended, a reverse turn of the wrist to bring the rod to its original position will be attended by retardation of the spool to prevent overrunning of the line.

Another object of my invention is to attain the foregoing advantages in a spool retarding means which is susceptible either of ready attachment to existent reels, or of incorporation incident to the manufacture of such reels without necessitating any radical changes in their basic construction or interfering with their normal mode of operation.

Other objects and attendant advantages will appear from the following detailed description of the attached drawings, wherein:

Fig. 1 is a view looking down upon a fishing reel attached to a fishing pole, which latter is shown in transverse section, with a brake means conveniently embodying my invention in one form illustrated in section.

Fig. 2 is a perspective view of the brake means of Fig. 1 removed from the reel.

Fig. 3 is a view corresponding to Fig. 1 showing how braking of the reel is affected upon bodily turning the fishing rod by a wrist movement of the grasping hand at the end of a line cast.

Fig. 4 is a fragmentary view similar to Fig. 1 showing an alternative embodiment of my invention.

Figs. 5 and 6 are detail views in section respectively showing other alternative embodiments of my invention.

With more specific reference first to Figs. 1 and 2 of these illustrations, the numerals 10 and 11 designate the laterally-spaced axially-recessed side members of the reel frame which are united as ordinarily by a plurality of tie bars 12, and which are secured to the bracket member 13 whereby the reel is fastened to the casting rod R. The winding spool 14 is disposed between the side members 10 and 11 with its outwardly convexed flanges 15 and 16 extending partway into the hollows of said members, and has trunnions 17 and 18 secured axially into opposite ends thereof. Trunnion 17 is journalled in a bearing 19 set into side member 10 at the center and is connected, as usual, through an enclosed train of gears (not illustrated) with a shaft 20 carrying the hand crank 21 by which the spool 14 is adapted to be driven in winding the fishing line. The other trunnion 18 is journalled in a bushing 22 which, it is to be understood, is adjustable in the side member 11 to allow a limited extent of free axial play of the spool 14.

In the form illustrated in Figs. 1–3, the spool restraining means of my invention includes a bracket 25 which is recessed or clevised as at 26 to engage over the peripheral edge of the side member 11 of the reel frame whereto it is secured by a set screw 27. As shown, bracket 25 overreaches the flange 16 of spool 14; and affixed thereto by a clamp plate 28 is a backing plate 29 within a groove 30. In the inner sloped face of said bracket is a strip 31 of friction material to serve as a brake shoe. Thus when the rod R is turned by a movement of the wrist of the hand of the user to change the reel from the line casting position of Fig. 1 to that of Fig. 3 after a line cast is made, the reel 14 will drop by gravity and its flange 16 be brought into engagement with the friction material or shoe 31. As a consequence, the reel 14 will be restrained in its rotation for the purpose hereinbefore mentioned. By means of the set screw 32, it is possible to adjust the bracket 25 radially of the spool axis to take up the wear on the friction material as may be desirable or required from time to time.

In the alternative embodiment illustrated in Fig. 4, the friction material 31a is backed by an angle piece 29a, said material and one of the flanges of said angle piece being pierced as shown and engaged over one of the tie rods 12 of the reel. A helical spring 35 surrounding the rod 12 and in compression between the frame member 10 and the backing piece 29a serves to hold the friction material 31a firmly pressed against the inner face of frame member 11.

In the alternative embodiment of Fig. 5, the flange 16 of the spool 14 is provided with a flat circumferential rim portion 16b of which the inner face is adapted to contact with the friction strip 31b. As in Fig. 4, the friction strip 31b is here pierced for sliding engagement on the tie rod 12 and urged toward the side member 11 of the reel frame by a spring 35b, said spring being however short from the standpoint of length in this instance, and buttressed against a collar 36 secured, with capacity for adjustment by means of a set screw 37 upon the rod 12. With this alternative construction, the inner face of the flat rim 16b of the spool flange 16 is brought into engagement with the friction material 31b when the reel is bodily moved in position as in Fig. 3 before the cast.

The form of the invention shown in Fig. 6 is identical with that of Fig. 5 except in that a short length 35c of rubber tubing is used instead of a spring to press the friction material 31b against the inner face of the rim 16b on the flange 16 of the reel 14.

It is to be understood that in all four instances, the restraining means may be used in duplicate if desired or found to be advantageous.

Having thus described my invention, I claim:

The combination with a fishing reel having a frame with spaced side members and an end flanged winding reel rotatively supported on an axis between said side members with capacity for limited endwise play, of a braking attachment comprising a clevised saddle-like bracket engaged over the peripheral edge of one of the side members of the reel frame, the outer face of one leg of the bracket being sloped at an angle toward the inner face of the corresponding end flange of the reel, a clamp screw-threadedly engaged in the other leg of the bracket and adapted to bear against the outer face of said one side member of the reel frame, an adjusting screw threaded through the arching portion of the bracket and bearing upon the periphery of the said one side member of the reel frame and a brake shoe of friction material affixed to the sloped outer face of the one leg of the bracket with a projecting portion thereof directed laterally toward the inner face of said one flange of the reel, whereby the reel, when held in a vertical position in line casting, is rotationally retarded through engagement of said one flange with the brake shoe, and when the reel is bodily turned to a horizontal position at the end of the cast, it will shift axially with incidental retraction of said one flange from engagement with the brake shoe.

References Cited in the file of this patent

UNITED STATES PATENTS

| | | |
|---|---|---|
| 1,305,910 | Liddell | June 3, 1919 |
| 2,637,508 | Battaglia | May 5, 1953 |
| 2,774,546 | Soffe | Dec. 18, 1956 |